Sept. 21, 1971   W. M. TAYLOR   3,606,904
VALVE
Filed March 23, 1970

William M. Taylor
INVENTOR

BY Hyer, Eickenroht
& Thompson
ATTORNEYS

United States Patent Office 3,606,904
Patented Sept. 21, 1971

3,606,904
VALVE
William M. Taylor, Houston, Tex., assignor to
Cameron Iron Works, Inc., Houston, Tex.
Filed Mar. 23, 1970, Ser. No. 21,595
Int. Cl. F16k 45/00
U.S. Cl. 137—102  9 Claims

ABSTRACT OF THE DISCLOSURE

A valve for quickly and automatically shifting between alternate positions for admitting a source of fluid pressure to an operator and venting the operator, respectively, in response to the relative values of supply and operator pressure.

---

This invention relates to valves, and, more particularly, to improvements in quick-exhaust valves.

Valves of this type are often used in systems in which a mechanism, such as an operator for a line valve, is caused to move to either of two positions in response to fluid pressure supplied to the operator through a line extending from a remote source of pressure. When supplied with pressure, the operator is caused to move to a first position, and thus, for example, open a line valve. When the supply line is exhausted, the operator is caused to move to a second position, and thus close the line valve. A quick-exhaust valve may be inserted into the supply line close to the operator to provide a bypass vent so that the operator may be rapidly exhausted even when the supply line pressure is only partially reduced.

An object of this invention is to provide a quick-exhaust valve of this type which may be immobilized after the operator has moved to its second position, so that reapplication of supply pressure will not cause the operator to move to its first position.

Another object is to provide a valve of the character above described which may be caused to move to its position for exhausting the operator by manual manipulation, and even though the supply line is not exhausted.

These and other objects are accomplished, as exemplified by the illustrated embodiment of the invention, by a valve comprising a primary valve means including a closure member shiftable within a chamber in the valve body between a first position closing a vent port from the chamber and a second position communicating the vent port with an operator port, together with a secondary valve means including a closure member carried by the primary closure member and movable to positions opening and closing communication between a supply port and the operator port. These valve means are so arranged that supply pressure greater than operator pressure will shift the primary member from its second to its first position and the secondary member from closed to open position to admit supply pressure to the operator, and so that operator pressure greater than supply pressure will shift the secondary closure member from open to closed position and the primary closure member from its first to its second position to exhaust operator pressure through the vent port.

A means is provided for locating the primary closure member in a third position within the chamber, when operator pressure is greater than supply pressure, in which thereafter supply pressure greater than operator pressure is ineffective to shift the primary closure member back to either its first or second positions. Thus, the valve and the operator are immobilized in the sense that they become unresponsive to another application of supply pressure. A means is also provided for manually venting the chamber to cause the secondary member to close and the primary valve member to shift from its first to its second position, even though operator pressure is less than supply pressure.

In a preferred embodiment of the invention, the operator port is in an end of the valve chamber, and the supply and vent ports are in the side of the chamber, with the vent port axially intermediate the supply and operator ports. The primary valve means of this preferred embodiment comprises a spool axially slidable within the chamber for covering the vent port in its first position and uncovering the vent port to communicate it with the operator port in its second position. The spool has a passageway in it for communicating the supply and operator ports, and the secondary valve means comprises check valve means carried by the spool to open the passageway when supply pressure is greater than operator pressure, and to close the passageway when the operator pressure is greater than supply pressure.

In this preferred embodiment, the means for locating the spool in the third position comprises a part selectively operable from the exterior of the body for axial movement within the end of the chamber opposite from the operator port between positions engaging the spool to locate it in either its second or its third position when operator pressure is greater than supply pressure. In the third position, the spool covers the supply port to close it and thereby render supply pressure ineffective to shift the spool from its third to its first position even though supply pressure is greater than operator pressure.

This preferred embodiment of the invention also includes an exhaust port in the side of the chamber which remains uncovered by the spool during shifting of the spool between its first and second positions, and a valve in the exhaust port for opening and closing it to thereby selectively vent the chamber even though supply pressure exceeds operator pressure. More particularly, this valve is manually operable from the exterior of the valve body.

In the drawings, wherein like reference characters are used throughout to designate like parts:

Figure 1:
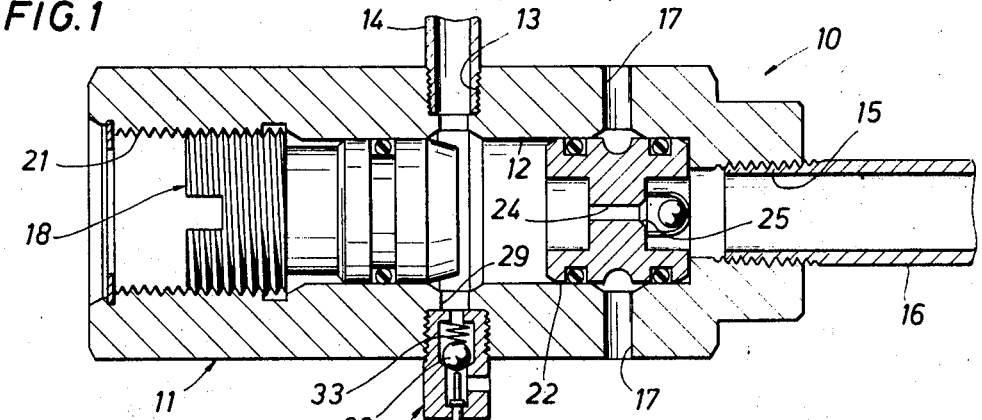
FIG. 1 is a longitudinal, sectional view of the preferred embodiment of the valve, showing the spool in its first position and the check valve means on the spool in its open to admit supply pressure to the operator.

With reference now to the details of the above-described drawings, the valve, which is indicated in its entirety by reference character 10, includes a valve body 11 having a cylindrical chamber 12 extending longitudinally therethrough. A supply port 13 connects the chamber with a tubing 14 leading from a source of supply pressure and a remote control means (not shown), an operator port 15 in the righthand end of the chamber connects it with a conduit 16 leading to a pressure responsive operator (not shown), and vent ports 17 connect the chamber with the exterior of the valve body 11 for venting fluid pressure from the chamber. Although two ports 17 are shown, only one is required.

Figure 2:
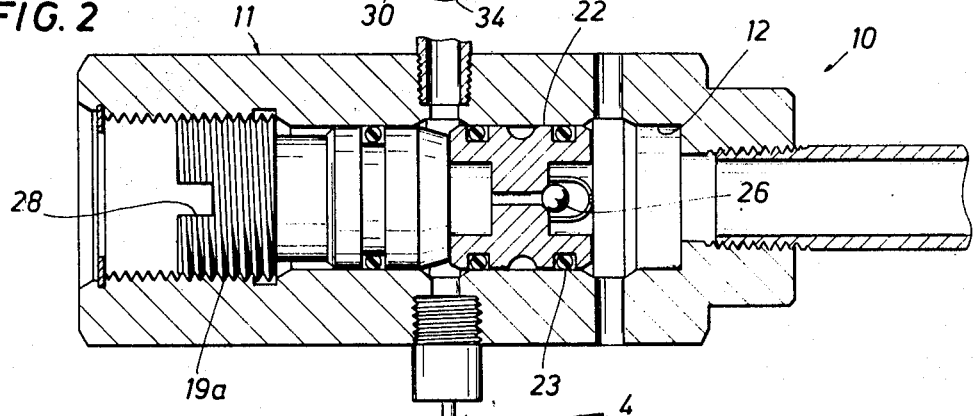
FIG. 2 is a view similar to FIG. 1, but showing the spool moved to its second position and the check valve means closed so as to vent the operator.
Figure 3:
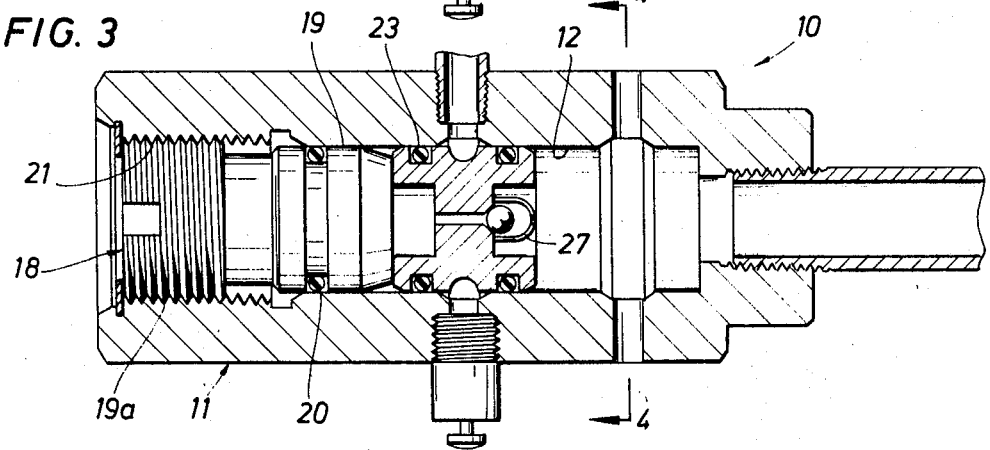
FIG. 3 is a similar view, but showing the adjustable part at the left end of the chamber retracted to a position to locate the spool in its third position in which supply pressure is ineffective to shift the spool.
Figure 4:
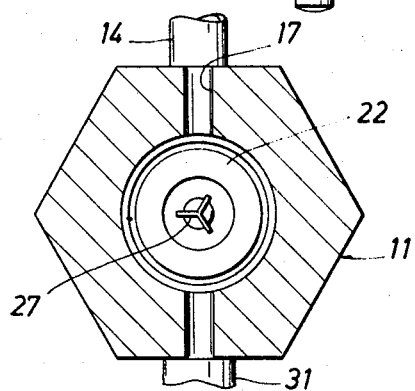
FIG. 4 is a cross-sectional view of the valve, as seen along broken line 4—4 of FIG. 3.

The lefthand end of the chamber is closed by a plug 18, which is axially movable within the valve body 11 between the inner position of FIGS. 1 and 2 and the outer position of FIG. 3. When disposed in its inner position, the plug is adapted to locate a shiftable spool in the chamber in a position for venting the operator. When disposed in its outer position, the plug is adapted to locate the spool in a third position in which supply pressure cannot shift it back to either its second or first position.

In either its inner or outer position, the plug forms a pressure-tight closure for the lefthand end of the chamber. Thus, the plug includes an inner end 19 carrying an O-ring 20 thereabout for sealably sliding within a portion of the chamber between supply port 13 and an outer enlarged and threaded end opening 21 of the valve body. The inner end 19 of the plug is moved to and located in either its inner or outer position by means of a head 19a threadedly engaging opening 21.

The primary valve means within chamber 12 comprises a spool 22 sealably slidable axially within the chamber between its first, second and third positions shown in FIGS. 1, 2 and 3, respectively. Two axially spaced seal rings 23 are carried about the body of the spool for sealing with the wall of the chamber. In the first position of the spool, the seal rings are on opposite sides of the vent ports 17. In the second position of the spool, wherein it is engaged with plug 18 in its inner psition (see FIG. 2), seal rings 23 are intermediate supply port 13 and vent ports 17. In the third position of the spool, wherein it engages the plug in its outer position (see FIG. 3), the seal rings are on opposite sides of the supply port, and supply pressure is ineffective to shift the spool.

Spool 22 has a passageway 24 extending therethrough to connect its opposite ends and thus bypass seal rings 23 for communicating the supply and operator ports in each of the first and second positions of the spool. The righthand end of passageway 24 is flared to provide a seat 25 for a ball check 26 carried within a cage 27. The ball check will be urged to open position by supply pressure greater than operator pressure and to seated position by operator pressure greater than supply pressure.

Thus, supply pressure greater than operator pressure will urge spool 22 from its second position to its first position and ball check 26 to open position so as to admit supply pressure to the operator. On the other hand, when operator pressure is greater than supply pressure, ball check 26 will move to its closed position, whereby the predominant pressure is active over the entire cross section of spool 22 to urge it from its first position to its second position so as to vent the operator through ports 17.

Consequently, valve 10 may be adjusted to prevent it from automatically returning to a position for admitting supply pressure to the operator merely by retraction of plug 18 to the position of FIG. 3. This adjustment may be made at any time during operation of the valve, because, in any case, when operator pressure becomes greater than supply pressure, it will cause spool 22 to be shifted to the third position of FIG. 3, in which position the spool will remain until plug 18 is returned to the inner position of FIGS. 1 and 2. When the plug is so returned, spool 22 is moved to the right to its second position, as shown in FIG. 2, wherein supply pressure greater than operator pressure will again automatically shift the spool to the first position of FIG. 1.

Plug 18 may be shifted between its alternate positions by manual manipulation from the exterior of the valve. Thus, slots 28 across its outer end may receive a tool for transmitting torque to the plug and moving it axially within opening 21. Suitable markings may be provided upon the opening to indicate whether the plug is in one or the other of its positions.

The means for selectively venting the chamber 12 to cause the spool to shift to the second position when supply pressure is greater than operator pressure, comprises an exhaust port 29 connecting chamber 12 with the outside of the valve body, and a check valve 30 installed in the port and adapted to open and close same in response to manual manipulation from the exterior of the valve body. Port 29 is located axially of chamber 12 so as to remain uncovered by the spool 22 during shifting of the spool between its first and second positions. Thus, with plug 18 in its inner position, seal rings 23 about the spool will always remain in the right port 29. As shown in the drawings, port 29 is opposite supply port 13, so that when plug 18 is in its outer position, and spool 22 is caused to shift to the third position of FIG. 3, the seal rings 23 about the spool will engage on opposite sides of port 29 so as to isolate it except for supply port 13.

As shown in FIG. 1, check valve 30 includes a casing 31 threaded into the outer end of port 29 and having a passageway through it connecting the inner end of the port with the exterior of the valve body 11, and a ball check 32 disposed within the passageway for movement between seated and unseated positions with respect to a seat about the passageway. As also shown in FIG. 1, a spring 33 within casing 31 normally urges ball check 32 to closed position. However, the ball check may be moved inwardly to open the passageway through casing 31 by means of a stem 34 extending through the casing and having an enlarged head on its outer end adapted to be manually engaged.

Consequently, in the event spool 22 is in the first position of FIG. 1, and it is desired to vent the operator even though supply pressure is greater than operator pressure, the check valve 30 can be moved to open position, as above described, so as to vent the chamber 12, and thereby cause the spool to move to the second position of FIG. 2 upon depression of the stem. Thus, venting of the chamber will cause the ball check 26 carried by the spool to move to seated position, just as it does when supply pressure drops below operator pressure, and when the ball check 26 closes, differential across the spool due to venting through port 29 causes the spool to be shifted to the left.

From the foregoing it will be seen that this invention is one well adapted to attain all of the ends and objects hereinabove set forth, together with other advantages which are obvious and which are inherent to the apparatus.

It will be understand that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a body having a chamber therein, and a supply port for connecting the chamber with a source of supply pressure, an operator port for connecting the chamber with a pressure responsive operator, and a vent port for venting the chamber, primary valve means including a closure member shiftable within the chamber between a first position closing the vent port and a second position communicating the operator and vent ports, secondary valve means including a closure member carried by the primary closure member and movable to positions opening or closing communication between the supply and operator ports, whereby supply pressure greater than operator pressure will shift said primary closure member from its second to its first position and move said secondary closure member from closed to open position to admit supply pressure to the operator port, and operator pressure greater than supply pressure will shift said secondary closure member from open to closed position and move said primary closure member from its first to its second position to vent operator pressure to the vent port, and means selectively operable to locate the primary closure member in a third position within the chamber when operator pressure is greater than supply pressure, in which third position supply pressure greater than operator pressure is ineffective to shift said primary closure member.

2. A valve of the character defined in claim 1, including means for optionally exhausting said chamber to cause said secondary closure member to close and said primary closure member to shift from its first to its second position even though supply pressure is greater than operator pressure.

3. A valve, comprising a body having a chamber therein, and a supply port for connecting the chamber with a source of supply pressure, an operator port for connecting the chamber with a pressure responsive operator, and a vent port for venting the chamber, means including a closure member axially slidable within the chamber between a first position closing the vent port and a second position communicating the operator and vent ports, check valve means in said closure member for opening and closing communication between the supply and operator ports when said supply pressure is respectively greater or less than operator pressure, whereby supply pressure greater than operator pressure will shift said primary member from its second to its first position and said check valve from closed to open position to admit supply pressure to the operator, and operator pressure greater than supply pressure will shift said check valve from open to closed position and said primary member from its first to its second position to vent operator pressure to the vent port, and means selectively operable from the exterior of the body to engage the closure member in order to locate it in a third axial position within the chamber when operator pressure is greater than supply pressure, in which third position supply pressure greater than operator pressure is ineffective to shift said closure member.

4. A valve of the character defined in claim 3, including manually operable means for exhausting said chamber to cause said check valve means to close and said closure member to shift from its first to its second position even though supply pressure is greater than operator pressure.

5. A valve, comprising a body having a chamber therein, a supply port in the side of the chamber for connection with a source of supply pressure, an operator port in an end of the chamber for connection with a pressure responsive operator, and a vent port in the side of the chamber axially intermediate the supply and operator ports, a spool slidable within the chamber between a first position covering the vent port to close it and a second position uncovering said vent port to communicate it with the operator port, said spool having a passageway therein for communicating the supply and the operator ports, and check valve means carried by the spool to open the passageway when said supply pressure is greater than operator pressure, and to close the passageway when operator pressure is greater than supply pressure, whereby supply pressure greater than operator pressure will shift said check valve means from closed to open position and said spool from its second to its first position to admit supply pressure to the operator, and operator pressure greater than supply pressure will shift said check valve means from open to closed position and said spool from its first to its second position to vent operator pressure through the vent port, and a part selectively movable within the chamber between positions in which it locates said spool in said second position or in a third position when operator pressure is greater than supply pressure, said spool covering said supply port to close it in its third position so that supply pressure is ineffective to shift said spool from said third to said first position even though it is greater than operator pressure.

6. A valve of the character defined in claim 5, wherein said spool has seal rings thereabout which seal with respect to the chamber wall on opposite sides of the vent port in the first position of the spool, between the vent and supply ports in the second position of the spool, and on opposite sides of the supply port in the third position of the spool.

7. A valve of the character defined in claim 5, including means for optionally exhausting said chamber to cause said check valve means to close and said spool to shift from its first to its second position even though operator pressure is greater than supply pressure, and means manually operable from the exterior of the valve body for moving the exhausting means to chamber exhausting position.

8. A valve of the character defined in claim 7, wherein said exhausting means includes an exhaust port in the side of the chamber and spaced axially of the chamber to remain uncovered by said spool during shifting of the spool between its first and second positions, and valve means in the exhaust port for opening and closing it.

9. A valve of the character defined in claim 8, wherein said spool has seal rings thereabout which seal with respect to the chamber wall on opposite sides of the vent port in the first position of the spool, and between the vent port and both the supply and exhaust ports in the second position of the spool.

References Cited

UNITED STATES PATENTS

| 3,034,527 | 5/1962 | Hennells | 137—102 |
| 3,185,138 | 5/1965 | Druzynski | 137—102 |
| 3,365,887 | 1/1968 | Underwood | 137—614.17 |
| 3,464,321 | 9/1969 | Piotrowski | 137—102 |

LAVERNE D. GEIGER, Primary Examiner

W. H. WRIGHT, Assistant Examiner

U.S. Cl. X.R.

137—109, 115